US008114921B2

(12) United States Patent
Poulton et al.

(10) Patent No.: US 8,114,921 B2
(45) Date of Patent: Feb. 14, 2012

(54) HYBRID POLYMER AND METHOD FOR MAKING

(75) Inventors: Jason T. Poulton, Akron, OH (US); Yuan-Yong Yan, Copley, OH (US); Wang Hao, Carmel, IN (US)

(73) Assignee: Bridgestone Corporation, Tokyo (JP)

( * ) Notice: Subject to any disclaimer, the term of this patent is extended or adjusted under 35 U.S.C. 154(b) by 52 days.

(21) Appl. No.: 12/519,549

(22) PCT Filed: Dec. 17, 2007

(86) PCT No.: PCT/US2007/025736
§ 371 (c)(1), (2), (4) Date: Nov. 23, 2009

(87) PCT Pub. No.: WO2008/076409
PCT Pub. Date: Jun. 26, 2008

(65) Prior Publication Data
US 2010/0160542 A1    Jun. 24, 2010

Related U.S. Application Data

(60) Provisional application No. 60/870,401, filed on Dec. 17, 2006.

(51) Int. Cl.
C08J 5/14 (2006.01)
(52) U.S. Cl. ........ 523/107; 523/150; 525/474; 525/475; 525/477
(58) Field of Classification Search ............... 524/588
See application file for complete search history.

(56) References Cited

U.S. PATENT DOCUMENTS

| | | | | |
|---|---|---|---|---|
| 6,156,822 A * | 12/2000 | Materne et al. | ............ | 523/212 |
| 6,166,108 A * | 12/2000 | Materne et al. | ............ | 523/212 |
| 6,172,138 B1 * | 1/2001 | Materne et al. | ............ | 523/212 |
| 6,313,220 B1 * | 11/2001 | Materne et al. | ............ | 524/863 |
| 6,359,034 B1 * | 3/2002 | Visel et al. | ............ | 523/212 |
| 6,462,141 B1 | 10/2002 | Kim et al. | | |
| 7,141,622 B2 * | 11/2006 | Bowen et al. | ............ | 524/492 |
| 7,288,594 B2 | 10/2007 | Ozawa et al. | | |
| 2003/0069332 A1 * | 4/2003 | Agostini et al. | ............ | 523/205 |

FOREIGN PATENT DOCUMENTS

| | | |
|---|---|---|
| EP | 1293529 A | 12/2006 |
| WO | WO 91/08241 | 6/1991 |
| WO | WO 93/04094 | 3/1993 |

OTHER PUBLICATIONS

A. Romo-Uribe et al., "Viscoelastic and Mophological Behavior of Hybrid Styryl-Based Polyhedral Oligomeric Silsequioxane (POSS) Copolymers," *J. Poly. Sci.: Part B: Polymer Physic* s, 1998, pp. 1857-1872, vol. 36 (John Wiley & Sons, Inc.; Hoboken, NJ).
R.M. Laine et al., "Polyfunctional Cubic Sisesquioxanes as Building Blocks for Organic/Inorganic Hybrids," *Applied Organometal. Chem.*, 1998, pp. 715-723, vol. 12 (John Wiley & Sons, Inc.; Hoboken, NJ).
M.C. Burleigh et al., "Imprinted Polysilsequioxanes for the Enhanced Recognition of Metal Ions," *Chem. Mater.*, 2001, pp. 2537-2546, vol. 13 (American Chemical Society; Washington, DC).
R.A. Mantz et al., "Thermolysis of Polyhedral Oligomeric Silsequioxane (POSS) Macromers and POSS-Siloxane Copolymers," *Chem. Mater.*, 1996, pp. 1250-1259, vol. 8 (American Chemical Society; Washington, DC).
G. Kickelbick, "Concepts for the incorporation of inorganic building blocks into organic polymers on a nanoscale," *Prog. Polym. Sci.*, 2003, pp. 83-114, vol. 28 (Elsevier Science Ltd.; Cambridge, England).
G. Li et al., "Polyhedral Oligomeric Silsesquioxane (POSS) Polymers and Copolymers: A Review," *J. Inorg. and Organometal. Polymers*, 2001, pp. 123-154, vol. 11(3) (Plenum Publishing Corp.; New York, NY).
J.H. Clark et al., "Catalysis of liquid phase organic reactions using chemically modified mesoporous inorganic solids," *Chem. Commun.*, 1998, pp. 853-862 (Royal Society of Chemistry; London, England).
J. Du et al., "Preparation of Organic/Inorganic Hybrid Hollow Particles Based on Gelation of Polymer Vesicles," *Macromolecules*, 2004, pp. 5710-5716, vol. 37 (American Chemical Society; Washington, DC).

\* cited by examiner

*Primary Examiner* — Robert Loewe
(74) *Attorney, Agent, or Firm* — Meredith E. Hooker; Zollinger & Burleson Ltd.

(57) ABSTRACT

A macromolecule includes a polymer directly tethered or bonded to a polyatomic functionality. The polyatomic functionality can be located at a terminus of the polymer and can be generated concurrent with or soon after formation of the polymer. The macro-molecule can be prepared from a functionalized polymer by hydrolyzing and condensing (e.g., by a sol-gel process) functionalities in which one or more alkoxy groups are bound to a silica atom in the presence of an excess of a compound that includes a Si, Ti, Zr, Sn, Al, or Fe atom. Such macromolecules can be used in the manufacture of vulcanizates and tire components, either alone or blended with other polymers and/or other particulate fillers.

11 Claims, No Drawings

HYBRID POLYMER AND METHOD FOR MAKING

This application claims the priority of Provisional U.S. Patent Application Ser. No. 60/870,401, filed Dec. 17, 2006, and PCT Application PCT/US07/25736, filed Dec. 17, 2007, the entire contents of which are incorporated herein.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

In the past decade, some effort in this regard has been directed to in situ (i.e., in a rubber composition) generation of filler particles in the hopes of achieving a homogeneous dispersion of filler particles in the rubber composition. Several of these have involved sol-gel conversion of tetraethyl orthosilicate (TEOS, also known as tetraethoxysilane); see, e.g., U.S. Pat. Nos. 6,172,138 and 6,359,034 as well as the publications cited therein.

During this same period, use of preformed, well-defined inorganic structures such as polysilsesquioxanes as foundations from which various functional and reactive groups can be attached and optionally used for further reactions also has been studied. Where the moieties being attached include organic groups, the resulting materials can be referred to as inorganic/organic hybrids.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

One aspect of the present invention involves a macromolecule that includes a polymer chain and a polyatomic functionality directly bonded thereto. The polyatomic functionality includes multiple M atoms (where M is Si, Ti, Zr, Sn, Al, or Fe) and is directly bonded to the polymer chain through at least one —Si—O—M— moiety. In certain embodiments, the polyatomic functionality can have an average diameter of no more than about 100 nm and/or can be synthesized in situ via a sol-gel process. In these and other embodiments, the polyatomic functionality can be located at a terminus of the polymer.

In other aspects are provided a composition that includes the above-described macromolecule in an organic solvent and a process for forming the macromolecule. The process involves providing a polymer that includes a functionality in which one or more alkoxy groups are bound to a silica atom; hydrolyzing one or more of the alkoxy groups in the presence of one or more compounds that include a M atom (where M is defined as above); and in situ synthesizing a polyatomic functionality that is bonded to the polymer through at least one —Si—O—M— moiety.

The macromolecule (i.e., fully functionalized polymer) can interact with particulate filler such as, e.g., carbon black and particularly silica. Compositions, including vulcanizates, that include particulate fillers and such polymers also are provided, as are methods of providing and using such compositions.

The polymer chain can include directly bonded aromatic pendent groups, can be substantially linear, and/or can include unsaturation within and/or pendent from the polymer chain. This unsaturation can result from incorporation of polyene mer units and preferably is substantially random along the length of the polymer chain.

The polymer that includes a functionality in which one or more alkoxy groups are bound to a silica atom (also referred to as an alkoxysilane-containing polymer) can have the general formula $$\{p\}_{4-c}\text{-J-SiR}_a(OR^1)_b \qquad (I)$$

where J is a moiety defined by at least one of the following general structures $$[SiR_2O]_d \qquad (I\text{-}a) \text{ or}$$

$$\{[SiR_e(OR^1)_{2-e}] - [(CH_2)_m Q'(CH_2)_n]\} \qquad (I\text{-}b)$$

(Variables used in the foregoing formulas are defined below, after formulas II-VI.)

The polyatomic functionality above can contain multiple Si-O bonds, and the polyatomic functionality can be located a terminus of the polymer. The above-described macromolecule in which M is Si can be provided by reacting a polymer according to formula (I) with one or more functional silanes having any of the following formulas:

(II)

(III)

$$(OR^2)_2SiZ, \qquad (IV)$$

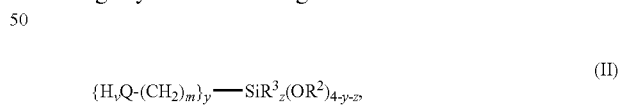

(V)

and

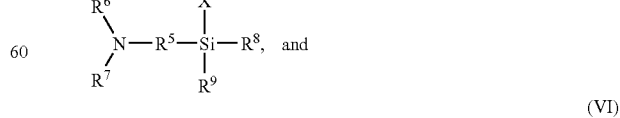

(VI)

In the foregoing formulas I to VI,
- each R independently is a hydrogen atom or $C_1$-$C_{20}$, preferably a $C_1$-$C_6$, alkyl group;
- {p} represents a polymer;
- a is an integer of from 0 to 2 inclusive, b is an integer of from 1 to 3 inclusive, and c=a+b with the proviso that c≦3;
- d is an integer of from 0 to about 42 inclusive, preferably from 0 to 20 inclusive, more preferably from 0 to 6 inclusive;
- e is an integer of from 0 to 2 inclusive;
- each m and n independently is an integer of from 0 to about 200 inclusive, preferably from 0 to 50 inclusive, and in some cases from 0 to 6 inclusive;
- w, x, y and z independently are integers of from 0 to 3 with the proviso that (y+z)≦3;
- each Q independently is a multivalent heteroatom such as, e.g., O, S, N, P, and the like, and v is an integer of from 1 to 3 inclusive as appropriate in view of the particular identity of Q, e.g., v=1 where Q is O or S, 2≦v≦3 where Q is P or N (e.g., —$NH_2$ or —$NH_3^+$), etc.;
- Q' is a multivalent heteroatom (e.g., O, S, etc.) or heteroatom-containing divalent group that does not contain an active hydrogen (e.g., NR', PR', etc., where R' is a $C_1$-$C_{20}$, preferably a $C_1$-$C_6$, alkyl group);
- Q" is Q' and other heteroatom-containing divalent groups (e.g., NH, PH, $NH_2^+$, $PH_2^+$, $NR_2^+$, $PR_2^+$, etc.), including carbonyl-containing groups (e.g., C(O), C(O)O, NHC(O)O, NHC(O)NH, etc.);
- Z is a -Q"$R^4$— group where Q" is defined as above and $R^4$ is a substituted or unsubstituted alkyl, alkenyl, cycloalkyl, cycloalkenyl, aryl, allyl, aralkyl, alkaryl, or alkynyl group, with the proviso that each of Q" and $R^4$ are directly bonded to the Si atom, i.e., together with the Si atom they form a cyclic structure;
- Z' is a substituted or unsubstituted $C_2$-$C_{10}$, preferably $C_2$-$C_5$, alkylene group that, together with the N and Si atoms to which each terminal C atom of the group is bonded, form a ring structure;
- X is a halogen atom, preferably a Cl atom;
- each $R^1$, $R^2$ and $R^3$ independently is an $R^4$ or a hydrogen atom;
- $R^5$ is a divalent organic group, preferably a substituted or unsubstituted $C_1$-$C_{10}$ alkylene group;
- each of $R^6$ and $R^7$ independently is a non-Zerewitinoff monovalent organic group or a hydrolyzable protecting group, i.e., a group that is relatively stable in essentially anhydrous conditions but which, when exposed to moisture, hydrolyzes readily (e.g., a trimethylsilyl group); and
- each of $R^8$ and $R^9$ independently is X or a monovalent organic group such as, e.g., a $C_1$-$C_{10}$ alkyl or alkoxy group.

The alkoxysilane group-containing polymer of formula (I) can be provided by reacting a carbanionic polymer with a functional silane of any of the following general formulas

$$R_f Si(OR^4)_{4-f} \quad (VII),$$

$$(OR^4)_2 SiZ' \quad (VIII), \text{ and}$$

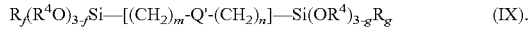
$$R_f(R^4O)_{3-f}Si—[(CH_2)_m-Q'-(CH_2)_n]—Si(OR^4)_{3-g}R_g \quad (IX).$$

where R, $R^4$, Q', m and n are defined as above, f and g independently are integers of from 0 to 2 inclusive, and Z' is a -Q'$R^4$— group where each of Q' and $R^4$ are directly bonded to the Si atom, i.e., together with the Si atom form a cyclic structure. Functional silanes defined by formulas (VII) and (VIII) result in a polymer where J is defined by formula (I-a) while functional silanes defined by formula (IX) result in a polymer where J is defined by formula (I-b).

Other aspects of the invention will be apparent to the ordinarily skilled artisan from the description of illustrative embodiments that follows. To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"macromolecule" means a chemical that includes within its structure one or more polymeric chains and at least one polyatomic moiety that includes one or more M atoms bonded to heteroatoms or heteroatom-containing groups in a random or organized structure (e.g., cage, partial cage, ladder, etc.);

"carbanionic" and "living" are used interchangeably;

"substituted" means one containing a heteroatom or functionality (e.g., hydrocarbyl group) that does not interfere with the intended purpose of the group in question;

"directly bonded" means covalently attached with no intervening or interposed atoms or groups;

"polyene" means a molecule with at least two double bonds located in the longest portion or chain thereof, and specifically is inclusive of dienes, trienes, and the like;

"radical" means that portion of a molecule which remains after reacting with another molecule, regardless of whether any atoms are gained or lost as a result of the reaction;

"terminus" means an end of a polymeric chain; and

"terminal moiety" means a group or functionality located at a terminus.

Throughout this document, all values given in the form of percentages are weight percentages unless the surrounding text explicitly indicates a contrary intention. The relevant portions of any specifically referenced patent and/or published patent application are incorporated herein by reference.

DETAILED DESCRIPTION OF ILLUSTRATIVE EMBODIMENTS

As described in the above Summary, the macromolecule involves a polymer directly bonded to a polyatomic functionality through at least one —Si—O—M— moiety; the linking moiety can include multiple M-O, e.g., Si—O, bonds. The polyatomic functionality can be located at a terminus of the polymer.

The macromolecule can be provided by hydrolyzing, in the presence of one or more compounds that include a M atom (where M is Si, Ti, Zr, Sn, Al, or Fe), one or more of the alkoxy groups of a functionalized polymer and in situ synthesizing a polyatomic functionality that is bonded to the polymer through at least one —Si—O—M— moiety. The one or more reactive compounds can include at least one functional silane defined by any of formulas (II) to (VI).

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from ~1 to ~50%, from ~10 to ~45%, or from ~20 to ~35%, of the polymer chain. The microstructure of such interpolymers can be random, which means that the mer units derived from each type of constituent monomer generally do not form blocks and, instead, are incorporated in a non-repeating, essentially simultaneous manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for rubber compositions intended for tire tread applications, controlling this manner of polyene incorporation can be desirable. A polymer chain with an overall 1,2-microstructure, given as a numerical percentage based on total polyene content, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be substantially linear.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75. Generally, the number average molecular weight of polymers can range from about 50,000 to about 500,000 Daltons, although in certain embodiments the number average molecular weight can range from about 75,000 to about 250,000 Daltons or even from about 90,000 to about 150,000 Daltons.

These types of polymers can be made by a variety of polymerization techniques. Solution polymerization generally affords a higher degree of control with respect to such properties as randomness, microstructure, etc., although other techniques, e.g., emulsion polymerization, also can be utilized. Solution polymerizations have been performed since about the mid-20th century, so the general aspects thereof are known to the ordinarily skilled artisan; nevertheless, certain aspects are provided here for convenience of reference.

Solution polymerizations typically involve an initiator as opposed to, e.g., a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylamino-lithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators which become incorporated into the polymer chain, thus providing a functional group at the initiated end of the chain, also can be used. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. Ordinarily skilled artisans are aware of other useful solvent options and combinations.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2'-di(tetrahydrofuryl) propane, di-piperidyl ethane, hexamethylphosphoramide, NN'-dimethylpiperazine, diazabicyclooctane, diethyl ether, tributylamine, and the like.

Although the ordinarily skilled artisan understands the conditions typically employed in solution polymerization, a representative description is provided for the convenience of the reader. The following is based on a batch process, although extending this description to, e.g., semi-batch or continuous processes is within the capability of the ordinarily skilled artisan.

Solution polymerizations typically begin by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions due primarily to the moisture and air sensitivity of most initiators and living polymers made therewith. The reactants can be heated up to about 150° C. and agitated. After a desired degree of conversion has been reached, the heat source (if used) can be removed and, if the reaction vessel is to be reserved solely for polymerizations, the reaction mixture can be removed to a post-polymerization vessel for functionalization and/or quenching. At this point, the reaction mixture commonly is referred to as a "polymer cement" because of its relatively high concentration of polymer.

While still in carbanionic form, the polymer can be reacted readily with one or more silanes, such as those defined above in formulas (VII)-(IX), so as to provide an alkoxysilane-functional polymer which need not be isolated or separated prior to undergoing additional reaction, although such steps are not excluded; in certain embodiments, this functional polymer can be as defined above in formula (I). Examples of silanes that can be used to provide such functional polymers include, but are not limited to, tetraethyl orthosilicate (TEOS, also known as tetraethoxysilane), methyltriethoxysilane, 1,2-bis(triethoxysilyl)-ethane, bis(methyldimethoxysilylpropyl)-N-methylamine, 2,2-dimethoxy-1-thia-2-silacyclopentane, and the like. This reaction can be completed in a few minutes up to about an hour at moderate temperatures (e.g., ~25° to ~50° C.). The silane can be diluted in a solvent, often of the same type as those used in performing the polymerization. This reaction results in an alkoxysilane-functional polymer which need not be isolated or separated prior to undergoing additional reaction, although such steps are not excluded.

One or more of the alkoxy groups of the functional polymer can be hydrolyzed. This hydrolysis is catalyzed by strong acids, bases, and nucleophiles in the presence water; see, e.g., R. J. P. Corriu et al., "Recent development of molecular chemistry for Sol-Gel process," *Angew. Chem. Int. Ed. Engl.,* 1996, 35, pp. 1420-36.

Where hydrolysis is performed in the absence of a compound that includes a M atom, the result is a mixture of terminal functional polymers and siloxane-coupled 2- and 3-arm polymers. The relative amounts of each can, to some extent, be controlled by choice of catalyst and by varying the amount (equivalents) of silane added relative to the amount of carbanionic polymer present, with lesser amounts of silane reactant and basic catalysis both generally resulting in more of the 2- and 3-arm coupled polymers.

The foregoing hydrolysis can performed in the presence of one or more compounds that include a M atom. This can result in a condensation reaction which can be facilitated by the presence of a condensation accelerator such as a combination of water (which can be added as part of a solution with an organic solvent such as a water-compatible alcohol or can be added or dispersed directly by any of a variety of system modifications) with a metal atom-containing compound such as, e.g., a carboxylic acid salt of tin or a titanium alkoxide. For more information concerning such accelerators including, in particular, examples of the metal atom-containing components thereof, the interested reader is directed to, e.g., U.S. Pat. Appl. Publ. No. 2005/0159554 A1.

Examples of potentially useful M atom-containing compounds which can be condensed during the hydrolysis include, but are not limited to various alkoxides, diketonates, acetates, acrylates, and halides such as Fe-containing compounds: alkoxides such as, e.g., iron (III) ethoxide, alkoxides such as, e.g., iron (III) methacrylate, and diketonates such as, e.g., iron (III) 2,4-pentanedionate;

Al-containing compounds: alumatrane, alkoxides such as, e.g., aluminum t-butoxide, aluminum isopropoxide, and aluminum phenoxide, and alkoxides such as, e.g., aluminum methacrylate;

Sn-containing compounds: tetra-t-butoxytin, tetraacetoxytin, bis(2-ethylhexanoate)tin, (triisopropoxytitanoxy) tri-n-butyltin;

Zr-containing compounds: alkoxides such as, e.g., zirconium ethoxide, zirconium n-propoxide, and zirconium isopropoxide, and diketonates such as, e.g., zirconium 2-ethylhexanoate, zirconium 2,4-pentanedionate;

Ti-containing compounds: alkoxides such as, e.g., titanium (IV) n-butoxide (TINBO), titanium t-butoxide, titanium isopropoxide, titanium ethoxide, and titanium di-n-butoxide bis(2-ethylhexanoate); and Si-containing compounds: any of a variety of functional silanes including those defined in formulas (II) to (VI), specific examples of which include, but are not limited to, (meth)acrylate-functional silanes such as (3-acryloxypropyl)tri-methoxysilane and methacryloxypropyltriethoxysilane; amino-functional silanes such as 3-aminopropyltriethoxysilane (APEOS), 3-aminopropyltrimethoxysilane (APMOS), 3-aminopropylmethyldiethoxysilane, (3(2-amino-ethylamino) propyl)-trimethoxysilane, 3(2(2-aminoethylamino) ethyl-amino)propyltrimethoxysilane, N-trimethoxysilylpropyl-N,N,N-trimethylammonium chloride, N-[3-(trimethoxysilyl)-propyl]-ethylenediamine (AEAPMOS), trimethoxy[3-(methylamino)propyl]silane (MAPMOS), N-trimethylsilyl-aza-2-chloro-2-methylsilacyclopentane and its ring-opened analog, N,N-bis-trimethylsilylaminopropylmethyldiethoxysilane, and the like; hydroxyl-functional silanes such as bis(2-hydroxyethyl)-3-aminopropyltriethoxysilane and N-(3-triethoxysilylpropyl)-gluconamide; sulfur-functional silanes such as 3-mercaptopropyl-triethoxysilane, 2,2-dimethoxy-1-thia-2-silacyclopentane, bis(3-(triethoxysilyl)propyl) tetrasulfide (TESPT), bis(m-(2-triethoxysilyl-ethyl) tolyl)-polysulfide, and bis(3-(triethoxysilyl)-propyl) thiourea; phosphine- and phosphate-functional silanes such as 2-(diphenylphosphino)ethyltriethoxysilane and diethylphosphato-ethyltriethoxysilane; $SiCl_4$ (which can be hydrolyzed to provide the desired —Si—O—Si— functionality); and polymeric silanes such as 1,3-[bis(3-triethoxysilylpropyl)-polyethyleneoxy]-2-methylenepropane ($C_{50}H_{104}O_{20}Si_2$) and trimethoxysilylpropyl-modified poly(ethyleneimine) ($1500 \leq M_w \leq 1800$). In certain embodiments, a functional silane of formula (II) where y is 1, z is 0, $R^2$ is an alkyl group, and m is an integer of from 1 to 6 inclusive can be preferred. In these and other embodiments, Q can be N, or Q can be P or S.

In certain embodiments, a mixture of M atom-containing compounds can provide preferred macromolecules. For example, one can use an excess (see below for additional information on typical amounts) of one type of M atom-containing compound (e.g., a relatively inexpensive material such TEOS and/or TINBO) and a lesser amount (although typically still in excess relative to the number of carbanionic polymer chains) of another M atom-containing compound which also contains additional functionality (such as described immediately below). This can result in a macromolecule that includes a relatively large polyatomic functionality having multiple M atoms as well as one or more other types of functionalities.

The result can be any one or more of several variants of functional polymer wherein the polyatomic functionality involves multiple M-A bonds (where A is a heteroatom such as O, S, N, P, etc., or a functionality containing such a heteroatom) and, at least in certain circumstances, additional functionality, e.g., from Q, Q', Q'', $R^1$-$R^4$, $R^5$-$R^9$, etc. (At least to some extent, the identity of the Q, Q', or Q'' moieties can be chosen or varied based on the type of additional filler, if any, employed in the compound or system in which the macromolecule is to be used. For example, in a vulcanizate composition that includes silica as an additional particulate filler, one might wish to select Q, Q', or Q" so as to provide interaction beyond that which can be obtained from the M-A moieties of the polyatomic functionality, e.g., an amine, ammonium, mercapto, phosphino, phosphate, etc., group; alternatively, in a vulcanizate composition that includes both silica and carbon black as additional fillers, Q, Q', or Q" can be chosen so as to provide interactivity with carbon black (e.g., an amine) while allowing the multiple M-A moieties to enhance interaction between the polymer and inorganic fillers such as, e.g., silica.)

The size of the polyatomic functionality can depend largely on the amount of the M-containing compound(s) utilized relative to carbanionic polymer. The amount of M atom-containing compound(s) can vary widely, although generally ranging from 3 to ~500 equivalents, often up to ~200 equivalents, and in certain embodiments up to ~100 equivalents of the M atom-containing compound(s) for each equivalent of living polymer. Where at least a 3× excess of the M atom-containing compound(s) is used, the resultant terminal functionality often can have ~3 to ~100 M atoms in a cage, partial cage, ladder, random, etc., arrangement. Regardless of specific structure, each type of functionality includes multiple M-A bonds is directly attached to the polymer chain through a —Si—O-M- moiety, optionally a —Si—(O-M)$_t$- moiety where t is 2 or 3.

Where M is Si (e.g., where a functional silane is used as the M-containing compound), the specific size of the polyatomic functionality depends largely on the amount of functional silane utilized relative to carbanionic polymer, as well as the type and amount of the functional silane utilized, with ~5 to ~100 equivalents of functional silane per equivalent of carbanionic polymer commonly being used. Where a moderate excess (e.g., ≦15×) of the functional silane compound is used, the resultant terminal functionality can be a mixture of cyclic and acyclic siloxanes with multiple polymer chains attached thereto. However, where a greater excess of the functional silane compound is used (e.g., ~20×) the resultant terminal functionality often can be a polysilsesquioxane such as a polyhedral oligomeric silsesquioxane; this type of functionality can take any of the various forms include cage, partial cage, ladder, random, etc., which are familiar to the ordinarily skilled artisan and examples of which can be found in a variety of references including, e.g., U.S. Pat. No. 6,972, 312, for possible homoleptic and heteroleptic POSS structures.

Solvent can be removed from the polymer cement by conventional techniques such as drum drying, extruder drying, vacuum drying or the like, which may be combined with coagulation with water, alcohol or steam, thermal desolventization. If coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least about 35 m$^2$/g, are preferred; surface area values can be determined by ASTM D-1765 using the cetyltrimethyl-ammonium bromide (CTAB) technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica (SiO$_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to deagglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 m$^2$/g, commonly from ~32 to ~400 m$^2$/g or from ~100 to ~250 m$^2$/g or from ~150 to ~220 m$^2$/g.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 parts by weight (pbw) per 100 parts of polymer (phr), preferably in an amount from about 5 to about 80 phr. When used with carbon black, the amount of silica can be decreased to as low as about 1 phr; as the amount of silica decreases, lesser amounts of the processing aids, plus silane if any, can be employed.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound.

Coupling agents can have a general formula of G-T-E, in which G represents a functional group capable of bonding physically and/or chemically with a group on the surface of the silica filler (e.g., surface silanol groups); T represents a hydrocarbon group linkage; and E represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the E and G functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and $Na_2SO_4$. Preferred micas contain principally alumina, silica and potash, although other variants are also useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All ingredients can be mixed with standard equipment such as, e.g., Banbury or Brabender mixers. Typically, mixing occurs in two or more stages. During the first stage (also known as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To avoid undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The following non-limiting, illustrative examples provide the reader with detailed conditions and materials that can be useful in the practice of the present invention. Percentages are by weight unless a specific contrary intention is indicated.

EXAMPLES

In the examples, dried glass vessels previously sealed with extracted septum liners and perforated crown caps under a positive $N_2$ purge were used for all preparations. Butadiene (in hexane, 22.4% for Examples 1-6, 19.2% for Examples 7-12, and 21.9% for Examples 13-18), styrene (33% in hexane), hexane, n-butyllithium (1.60 M in hexane), 2,2-bis(2'-tetrahydrofuryl)propane solution (1.6 M solution in hexane, stored over $CaH_2$), and butylated hydroxytoluene (BHT) solution in hexane were used.

Commercially available reagents and starting materials included the following (with as-purchased purities given in parentheses), all of which were acquired from Sigma-Aldrich Co. (St. Louis, Mo.) and used without further purification unless otherwise noted in a specific example: NaOH pellets (97% purity), triethylamine (99.5% purity), TEOS (99% purity), APEOS (99% purity), APMOS (97% purity), AEAP-MOS (97% purity), (97% purity), triethoxymethylsilane (99% purity), and MAPMOS (97% purity). TINBO (99% purity) was acquired from Acros Organics (Geel, Belgium).

Testing data in the Examples was performed on filled compositions made according to the formulation shown in Tables 1a (carbon black as sole type of filler), 1b (carbon black and silica) and 1c (silica as sole type of filler). In these tables, N-phenyl-N'-(1,3-dimethylbutyl)-p-phenylenediamine acts as an antioxidant, benzothiazyl-2-cyclohexyl-sulfenamide and N,N'-diphenylguanidine act as accelerators, and N-(cyclohexylthio)phthalimide acts as an inhibitor against premature vulcanization.

TABLE 1a

Compound formulation, carbon black only

| | Amount (phr) |
|---|---|
| Masterbatch | |
| polymer | 100 |
| carbon black (N343 type) | 55 |
| wax | 1 |
| N-phenyl-N'-(1,3-dimethylbutyl)-p-phenylenediamine | 0.95 |
| ZnO | 2.5 |
| stearic acid | 2 |
| aromatic processing oil | 10 |
| Final | |
| sulfur | 1.3 |
| N-cyclohexylbenzothiazole-2-sulfenamide | 1.7 |
| N,N'-diphenylguanidine | 0.2 |
| TOTAL | 174.65 |

TABLE 1b

Compound formulation, carbon black and silica

| | Amount (phr) |
|---|---|
| Masterbatch | |
| polymer | 100 |
| silica | 30 |
| carbon black (N343 type) | 35 |
| N-phenyl-N'-(1,3-dimethylbutyl)-p-phenylenediamine | 0.95 |
| stearic acid | 1.5 |
| aromatic processing oil | 10 |

TABLE 1b-continued

Compound formulation, carbon black and silica

| | Amount (phr) |
|---|---|
| Re-mill | |
| 60% disulfide silane on carrier | 4.57 |
| Final | |
| ZnO | 2.5 |
| sulfur | 1.7 |
| N-cyclohexylbenzothiazole-2-sulfenamide | 1.5 |
| N-(cyclohexylthio)phthalimide | 0.25 |
| N,N'-diphenylguanidine | 0.5 |
| TOTAL | 188.47 |

TABLE 1c

Compound formulation, silica only

| | Amount (phr) |
|---|---|
| Masterbatch | |
| synthetic polymer | 80 |
| natural rubber | 20 |
| silica | 52.5 |
| wax | 2 |
| N-phenyl-N'-(1,3-dimethylbutyl)-p-phenylenediamine | 1 |
| stearic acid | 2 |
| aromatic processing oil | 10 |
| Re-mill | |
| 60% disulfide silane on carrier | 5 |
| silica | 2.5 |
| Final | |
| ZnO | 2.5 |
| sulfur | 1.5 |
| 2,2-dibenzothiazole disulfide | 2 |
| N-(t-butyl)-2-benzothiazole sulfenamide | 0.7 |
| N,N'-diphenylguanidine | 1.4 |
| TOTAL | 183.1 |

Data corresponding to "50° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 50° C.

Data corresponding to "Dispersion index" were calculated using the equation $$DI = 100 - \exp[A \times \log_{10}(F^2H) + B]$$

where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

Data corresponding to "Bound rubber" were determined using the procedure described by J. J. Brennan et al., *Rubber Chem. and Tech.*, 40, 817 (1967).

Examples 1-6

To a $N_2$-purged reactor equipped with a stirrer was added 1.64 kg hexane, 0.41 kg styrene solution, and 2.43 kg butadiene solution. The reactor was charged with 3.64 mL n-butyllithium, followed by 1.05 mL 2,2-bis(2'-tetrahydrofuryl)propane solution. The reactor jacket was heated to 50° C. and, after ~28 minutes, the batch temperature peaked at ~65° C.

After an additional ~25 minutes, a portion of polymer cement was transferred from the reactor to a dried glass vessel (sample 1) and quenched with isopropanol.

A solution of 2.1 mL TEOS in 30 mL hexane was added to the remainder of the polymer cement, and this mixture was stirred at 50° C. for ~30 min Five portions of the cement were transferred to dried glass vessels. One of these (sample 2) was terminated with isopropanol without undergoing further reaction.

Each of the remaining four samples was reacted with triethoxymethylsilane, with the amount used with each sample being given as a ratio relative to the amount of n-BuLi initiator utilized:
  sample 3: 5:1
  sample 4: 10:1
  samples 5-6: 20:1

To each of these, 1% (v/v) aqueous NaOH solution (1.5 N for samples 3-5 and 2.5 N for sample 6) was added and stirred for ~2 hours.

Each of the samples was coagulated in isopropanol containing BHT and drum dried.

Using the formulation from Table 1b above, vulcanizable elastomeric compounds containing reinforcing fillers were prepared from samples 1-6. Results of physical testing on these compounds are shown below in Table 2.

TABLE 2

| | Testing data from Examples 1-6 | | | | | |
|---|---|---|---|---|---|---|
| | 1 | 2 | 3 | 4 | 5 | 6 |
| $M_n$ (kg/mol) | 112 | 163 | 246 | 186 | 153 | 173 |
| $M_w/M_n$ | 1.05 | 1.69 | 1.66 | 1.59 | 1.40 | 1.54 |
| % coupling | 3.3 | 51.8 | 80.4 | 63.2 | 47.4 | 58.5 |
| $T_g$ (° C.) | −39.0 | −38.7 | −38.8 | −38.8 | −38.8 | −38.8 |
| Dispersion index | 73.3 | 74.8 | 74.3 | 72.0 | 71.7 | 80.7 |
| Bound rubber (%) | 21.1 | 65.5 | 66.2 | 68.4 | 69.3 | 68.8 |
| 171° C. MDR $t_{50}$ (min) | 6.87 | 6.46 | 5.29 | 5.81 | 5.96 | 5.44 |
| 171° C. MH-ML (kg-cm) | 22.8 | 19.5 | 20.6 | 18.6 | 18.5 | 19.2 |
| $ML_{1+4}$ @ 130° C. | 61.9 | 105.0 | 116.5 | 108.8 | 108.3 | 110.6 |
| 300% modulus @ 23° C. (MPa) | 10.4 | 14.1 | 17.8 | 16.4 | 15.8 | 17.8 |
| Tensile strength @ 23° C. (MPa) | 13.8 | 16.8 | 18.5 | 19.7 | 17.7 | 19.4 |
| Temp. sweep 0° C. tan δ | 0.177 | 0.213 | 0.219 | 0.221 | 0.231 | 0.227 |
| Temp. sweep 50° C. tan δ | 0.233 | 0.185 | 0.177 | 0.180 | 0.179 | 0.175 |
| RDA 0.25-14% ΔG' (MPa) | 10.816 | 3.040 | 3.215 | 2.221 | 2.097 | 2.541 |

TABLE 2-continued

Testing data from Examples 1-6

|  | 1 | 2 | 3 | 4 | 5 | 6 |
|---|---|---|---|---|---|---|
| 50° C. RDA strain sweep (5% strain) tan δ | 0.2459 | 0.1686 | 0.1505 | 0.1508 | 0.1406 | 0.1423 |
| 50° C. Dynastat tan δ | 0.2210 | 0.1597 | 0.1506 | 0.1477 | 0.1430 | 0.1406 |

From the data of Table 2, one can see that styrene/butadiene interpolymers having directly bonded moieties that include multiple Si—O bonds can provide excellent combinations of physical properties such as 50° C. strain sweep tan δ (an indicator of reduced hysteresis), modulus, tensile strength, ΔG', etc., in silica-containing formulations. Such functionalized interpolymers (Examples 3-6) can exhibit significant reductions in 50° C. tan δ values (i.e., improved hysteresis loss), ~40-45% compared to a control interpolymer (Example 1) and even ~10-15% when compared to a trialkoxysilane functional polymer (Example 2); these reductions in hysteresis are obtained without a significant increase in compound Mooney viscosity ($ML_{1+4}$). Additionally, these same vulcanizates are predicted to exhibit better wet traction performance (tan δ at 0° C.) and reduced Payne effect (ΔG').

Further, comparing Example 3 (5:1 excess of silane relative to initiator) to Examples 5-6 (20:1 excess), one can see that the functionalized polymers made with the greater excess of silane had decreased $M_n$, PDI (ratio of $M_w$ to $M_n$), and tan δ at 50° C. values. Each of these can be desirable characteristics in certain end-use applications.

Examples 7-12

To a $N_2$-purged reactor equipped with a stirrer was added 1.24 kg hexane, 0.41 kg styrene solution, and 2.83 kg butadiene solution. The reactor was charged with 3.20 mL n-butyllithium, followed by 1.05 mL 2,2-bis(2'-tetrahydrofuryl)propane solution. The reactor jacket was heated to 50° C. and, after ~28 minutes, the batch temperature peaked at ~70° C.

After an additional ~25 minutes, a portion of polymer cement was transferred from the reactor to a dried glass vessel (sample 7) and quenched with isopropanol.

A solution of 2.1 mL TEOS in 30 mL hexane was added to the remainder of the polymer cement, and this mixture was stirred at 50° C. for ~30 min Five portions of the cement were transferred to dried glass vessels. To one of these (sample 8), ~4 mL water was added and stirred at room temperature for ~4 hours.

Each of the remaining four samples was reacted with an excess (20:1 relative to the amount of n-BuLi initiator utilized) of the following trialkoxysilanes:

sample 9: APEOS
sample 10: APMOS
sample 11: AEAPMOS
sample 12: MAPMOS

To each of these, 4 mL aqueous NaOH solution (1.5 N) per 500 mL polymer cement was added and stirred at room temperature for ~4 hours.

Each of the samples was coagulated in isopropanol containing BHT and drum dried.

Using the formulations from Tables 1a and 1b above, vulcanizable elastomeric compounds containing reinforcing fillers were prepared from samples 7-12. Results of physical testing on these compounds are shown below in Table 3. For those rows that include two data points, the upper is for a formulation from Table 1a, and the lower is for a formulation from Table 1b.

TABLE 3

Testing data from Examples 7-12

|  | 7 | 8 | 9 | 10 | 11 | 12 |
|---|---|---|---|---|---|---|
| $M_n$ (kg/mol) | 119 | 127 | 170 | 169 | 170 | 168 |
| $M_w/M_n$ | 1.03 | 1.13 | 1.23 | 1.22 | 1.23 | 1.21 |
| % coupling | 2.8 | 13.0 | 47.2 | 46.2 | 47.5 | 45.7 |
| $T_g$ (° C.) | −40.6 | −39.6 | −41.0 | −41.0 | −41.1 | −41.1 |
| Dispersion index | 97.6 | 99.4 | 94.9 | 95.0 | 93.6 | 96.5 |
|  | 86.2 | 81.2 | 81.9 | 90.6 | 86.8 | 89.6 |
| Bound rubber (%) | 16.4 | 44.2 | 36.9 | 38.7 | 33.0 | 36.5 |
|  | 23.7 | 67.6 | 75.1 | 75.4 | 72.4 | 71.4 |
| 171° C. MDR $t_{50}$ (min) | 2.90 | 2.59 | 1.27 | 0.96 | 1.47 | 1.76 |
|  | 4.48 | 3.99 | 2.09 | 1.70 | 1.42 | 2.95 |
| 171° C. MH-ML (kg-cm) | 19.1 | 17.4 | 18.3 | 18.0 | 19.8 | 19.1 |
|  | 23.9 | 19.9 | 18.8 | 20.2 | 19.0 | 19.7 |
| $ML_{1+4}$ @ 130° C. | 34.2 | 76.0 | 76.3 | 83.0 | 77.9 | 71.1 |
|  | 35.7 | 72.7 | 116.0 | 110.3 | 104.8 | 103.1 |
| Modulus$^a$ @ 23° C. (MPa) | 11.3 | 13.3 | 13.4 | 12.9 | 13.7 | 14.2 |
|  | 7.8 | 9.3 | 9.8 | 10.0 | 9.8 | 10.1 |
| Tensile strength @ 23° C. (MPa) | 17.7 | 20.3 | 16.4 | 15.2 | 18.2 | 21.2 |
|  | 14.7 | 15.6 | 15.3 | 14.2 | 14.9 | 14.3 |
| Temp. sweep 0° C. tan δ | 0.180 | 0.193 | 0.193 | 0.189 | 0.175 | 0.186 |
|  | 0.177 | 0.240 | 0.236 | 0.232 | 0.234 | 0.230 |
| Temp. sweep 50° C. tan δ | 0.259 | 0.195 | 0.166 | 0.172 | 0.168 | 0.177 |
|  | 0.227 | 0.159 | 0.138 | 0.137 | 0.135 | 0.135 |
| RDA 0.25-14% ΔG' (MPa) | 4.833 | 2.867 | 1.799 | 1.874 | 2.523 | 1.632 |
|  | 6.921 | 2.163 | 2.083 | 1.898 | 1.813 | 1.817 |

TABLE 3-continued

Testing data from Examples 7-12

|  | 7 | 8 | 9 | 10 | 11 | 12 |
|---|---|---|---|---|---|---|
| 50° C. RDA strain sweep (5% strain) tan δ | 0.2567 | 0.1868 | 0.1473 | 0.1522 | 0.1618 | 0.1398 |
|  | 0.2202 | 0.1400 | 0.1278 | 0.1286 | 0.1311 | 0.1264 |
| 50° C. Dynastat tan δ | 0.2393 | 0.1742 | 0.1425 | 0.1528 | 0.1469 | 0.1379 |
|  | 0.2058 | 0.1327 | 0.1168 | 0.1188 | 0.1178 | 0.1152 |

$^a$300% modulus for the carbon black-only formulation and 200% modulus for the mixed filler formulation.

The data of Table 3 exhibit the same general trends as seen with respect to Table 2, specifically, that styrene/butadiene interpolymers having directly bonded moieties that include multiple Si—O bonds can provide excellent combinations of physical properties. Such functionalized interpolymers (Examples 9-12) can exhibit significant reductions in 50° C. tan δ values (i.e., improved hysteresis loss), ~40-45% compared to a control interpolymer (Example 7) and even ~20-25% when compared to a trialkoxysilane functional polymer (Example 8) in mixed filler formulations and even ~35-45% in a carbon black-only formulation. These reductions in hysteresis are obtained without a significant increase in compound Mooney viscosity ($ML_{1+4}$). Additionally, these same vulcanizates are predicted to exhibit better wet traction performance (tan δ at 0° C.) and reduced Payne effect (ΔG').

Examples 13-18

To a $N_2$-purged reactor equipped with a stirrer was added 1.59 kg hexane, 0.41 kg styrene solution, and 2.49 kg butadiene solution. The reactor was charged with 3.60 mL n-butyllithium solution, followed by 1.05 mL 2,2-bis(2'-tetrahydrofuryl)propane solution. The reactor jacket was heated to 50° C. and, after ~28 minutes, the batch temperature peaked at ~62° C.

After an additional ~25 minutes, a portion of polymer cement was transferred from the reactor to a dried glass vessel (sample 13).

A solution of 2.1 mL TEOS in 30 mL hexane (which was designed to provide a ratio of 3:2 TEOS to initiator) was added to the remainder of the polymer cement, and this mixture was stirred at 50° C. for ~30 min Five portions of the cement were transferred to dried glass vessels. One of these (sample 14) was set aside and did not undergo any further reaction.

To each of the remaining four samples was added an M atom-containing compound, with the amount used with each sample being given as a ratio relative to the amount of n-BuLi initiator utilized. After mixing, ~4 mL of aqueous NaOH solution was added. The details of these functionalizations are set forth below in Table 4.

TABLE 4

Details of functionalization for samples 15-18

|  | [NaOH] (N) | M atom-containing compound(s) | Ratio(s) relative to initiator |
|---|---|---|---|
| sample 15 | 3.0 | TEOS | 15:1 |
| sample 16 | 3.0 | TEOS + TINBO | 10:10:1 |
| sample 17 | 1.5 | TINBO | 15:1 |
| sample 18 | 3.0 | TINBO | 15:1 |

Each sample was stirred for ~6 hours.

Each sample was coagulated in isopropanol containing BHT and drum dried.

Using the formulation from Table 1c above, vulcanizable elastomeric compounds containing reinforcing filler were prepared from samples 1-6. Results of physical testing on these compounds are shown below in Table 5.

TABLE 5

Testing data from Examples 13-18

|  | 13 | 14 | 15 | 16 | 17 | 18 |
|---|---|---|---|---|---|---|
| $M_n$ (kg/mol) | 115 | 151 | 304 | 155 | 161 | 198 |
| $M_w/M_n$ | 1.06 | 1.41 | 1.64 | 1.36 | 1.35 | 1.58 |
| % coupling | 0 | 42.8 | 86.7 | 47.1 | 52.5 | 67.0 |
| $T_g$ (° C.) | −36.4 | −36.0 | −36.3 | −36.2 | −36.2 | −35.9 |
| Dispersion index | 90.4 | 91.2 | 70.7 | 85.0 | 68.9 | 76.6 |
| Bound rubber (%) | 16.1 | 36.9 | 50.5 | 82.4 | 67.4 | 47.3 |
| 171° C. MDR $t_{50}$ (min) | 5.15 | 4.77 | 4.59 | 3.81 | 3.77 | 3.63 |
| 171° C. MH-ML (kg-cm) | 24.4 | 23.1 | 20.0 | 18.2 | 18.9 | 19.1 |
| $ML_{1+4}$ @ 130° C. | 24.0 | 45.8 | 61.5 | 55.8 | 55.8 | 57.5 |
| 300% modulus @ 23° C. (MPa) | 8.7 | 10.7 | 11.5 | 12.3 | 12.5 | 13.1 |
| Tensile strength @ 23° C. (MPa) | 13.9 | 15.9 | 14.0 | 15.2 | 13.7 | 14.7 |
| Temp. sweep 0° C. tan δ | 0.175 | 0.197 | 0.238 | 0.261 | 0.254 | 0.255 |
| Temp. sweep 50° C. tan δ | 0.131 | 0.122 | 0.106 | 0.090 | 0.080 | 0.089 |
| RDA 0.25-14% ΔG' (MPa) | 5.475 | 2.964 | 1.589 | 0.725 | 0.828 | 0.903 |
| 50° C. RDA strain sweep (5% strain) tan δ | 0.1500 | 0.1113 | 0.0903 | 0.0713 | 0.0725 | 0.0739 |
| 50° C. Dynastat tan δ | 0.1166 | 0.0959 | 0.0754 | 0.0595 | 0.0598 | 0.0644 |

From the data of Table 5, one can see that styrene/butadiene interpolymers having directly bonded polyatomic functionalities that include multiple M atoms can provide excellent combinations of physical properties such as 50° C. strain sweep tan δ (an indicator of reduced hysteresis), modulus, tensile strength, ΔG', etc., in silica-containing formulations. Such functionalized interpolymers (Examples 15-18) can exhibit significant reductions in 50° C. tan δ values, ~40-53% compared to a control interpolymer (Example 13) and even ~19-36% when compared to a trialkoxysilane functional polymer (Example 14); these reductions in hysteresis are obtained with only slight increases in compound Mooney viscosity ($ML_{1+4}$) counterbalanced by an increase in bound rubber values. Additionally, these same vulcanizates are predicted to exhibit better wet traction performance (higher tan δ at 0° C. values) and reduced Payne effect (ΔG').

That which is claimed is:

1. A process for forming a macromolecule that comprises a polymer bonded at a terminus through at least one —Si—O—M— moiety to a polyatomic functionality that comprising multiple M atoms where M represents Si, Ti, Zr, Sn, Al, or Fe, said process comprising:
   a) in an organic solvent medium, reacting a carbanionic polymer with one or more functional silanes having any of the general formulas $R_f Si(OR^4)_{4-f}$ $(OR^4)_2 SiZ'$, and $R_f(R^4O)_{3-f}Si—[(CH_2)_m-Q'-(CH_2)_n]—Si(OR^4)_{3-g}R_g$, where
   Q' is a divalent heteroatom or a heteroatom-containing divalent linking group that is free of active hydrogen atoms,
   f and g independently are integers of from 0 to 2 inclusive,
   m and n independently are integers of from 0 to about 200 inclusive,
   each $R^4$ independently is a substituted or unsubstituted alkyl, alkenyl, cycloalkyl, cycloalkenyl, aryl, allyl, aralkyl, alkaryl, or alkynyl group,
   each R independently is a hydrogen atom or $C_1$-$C_{20}$ alkyl group; and
   Z' and the Si atom to which is bonded constitute a cyclic group that comprises a divalent heteroaton or a heteroatom-containing divalent group in its ring structure,
   thereby providing a polymer that comprises a functionality in which at least one alkoxy group is bonded to a silicon atom, said polymer having the general formula ${p}_{4-c}$-J-SiR$_a$(OR$^1$)$_b$ where
   each J independently is a moiety defined by one of the following general structures $[SiR_2O]_d$ or ${[SiR_e(OR^1)_{2-e}]—[(CH_2)_m Q'(CH_2)_n]}$, {p} represents a polymer chain,
   each $R^1$ independently is a hydrogen atom or a substituted or unsubstituted alkyl, alkenyl, cycloalkyl, cycloalkenyl, aryl, allyl, aralkyl, alkaryl, or alkynyl group,
   a is an integer of from 0 to 2 inclusive, b is an integer of from 1 to 3 inclusive, and c=a+b with the proviso that c≦3,
   d is an integer of from 0 to about 42 inclusive,
   e is an integer of from 0 to 2 inclusive, and
   m and n independently are integers of from 0 to about 200 inclusive;
   b) adding to said organic solvent medium one or more hydrolyzable compounds that comprises a M atom; and
   c) hydrolyzing and condensing said polymer which comprises at least one alkoxy group bonded to a silicon atom and said one or more hydrolyzable compounds that comprises a M atom to afford said macromolecule that comprises a polymer bonded at a terminus through said at least one —Si—O—M— moiety to said polyatomic functionality.

2. The process of claim 1 wherein M is Si and at least one of said one or more compounds comprising a M atom has any of the following general formulas:

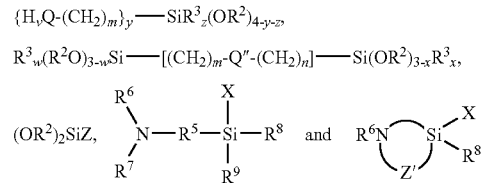

where
each Q independently is a multivalent heteroatom, and v is an integer of from 1 to 3 inclusive, as appropriate in view of the valence of the Q atom with which it is associated;
Q" is a divalent heteroatom or a heteroatom-containing divalent linking group;
each m and n independently is an integer of from 0 to about 42 inclusive;
w, x, y and z independently are integers of from 0 to 3 with the proviso that (y+z)≦3;
Z is a -Q"$R^4$— group where $R^4$ is a substituted or unsubstituted alkyl, alkenyl, cycloalkyl, cycloalkenyl, aryl, allyl, aralkyl, alkaryl, or alkynyl group, and where each of Q" and $R^4$ is directly bonded to the Si atom;
Z' is a substituted or unsubstituted $C_2$-$C_{10}$ alkylene group that, together with the N and Si atoms to which each terminal C atom of the group is bonded, form a ring structure;
X is a halogen atom;
each $R^2$ and $R^3$ independently is a hydrogen atom or a substituted or unsubstituted alkyl, alkenyl, cycloalkyl, cycloalkenyl, aryl, allyl, aralkyl, alkaryl, or alkynyl group;
$R^5$ is a divalent organic group;
each of $R^6$ and $R^7$ independently is a non-Zerewitinoff monovalent organic group or a hydrolyzable protecting group; and
each of $R^8$ and $R^9$ independently is X or a monovalent organic group.

3. The process of claim 2 wherein at least one of said one or more compounds comprising a M atom has the general formula ${H_v Q-(CH_2)_m}_y—SiR^3_z(OR^2)_{4-y-z}$ where y is 1, z is 0, $R^2$ is an alkyl group, and m is an integer of from 1 to 6.

4. The process of claim 2 wherein at least one of said one or more compounds comprising a M atom further comprises at least one of an amine, mercapto, phosphino, and phosphate group.

5. The process of claim 2 wherein each of said one or more compounds comprising a M atom is added in stoichiometric excess.

6. The process of claim 5 wherein from 5 to 100 equivalents of said one or more compounds that comprises a M atom are utilized for each equivalent of polymer that comprises a functionality in which at least one alkoxy group is bonded to a silicon atom.

7. The process of claim 1 wherein M is Ti and at least one of said one or more compounds comprising a M atom is a titanium (IV) alkoxide.

8. The process of any of claims 1 or 2 to 7 wherein said polyatomic functionality has an average diameter of no more than about 100 nm.

9. The process of any of claims 1, 2 to 5 or 7 wherein from 5 to about 500 equivalents of said one or more compounds comprising a M atom are utilized for each equivalent of polymer.

10. The process of any of claims 1, 2 to 7, or 8 to 9 further comprising blending said macromolecule with ingredients that comprise one or more types of particulate filler so as to form a composition.

11. The process of claim 10 further comprising vulcanizing said composition.

* * * * *

UNITED STATES PATENT AND TRADEMARK OFFICE
CERTIFICATE OF CORRECTION

| | | |
|---|---|---|
| PATENT NO. | : 8,114,921 B2 | Page 1 of 1 |
| APPLICATION NO. | : 12/519549 | |
| DATED | : February 14, 2012 | |
| INVENTOR(S) | : Poulton et al. | |

It is certified that error appears in the above-identified patent and that said Letters Patent is hereby corrected as shown below:

In column 19, line 10, delete "comprising" and insert -- comprises --.

In column 19, line 33, delete "group;" and insert -- group, --.

In column 19, line 34, insert -- it -- after the word "which".

In column 19, line 35, delete "heteroaton" and insert -- heteroatom --.

In column 19 line 57, delete "c$\leqq$3," and insert -- c$\leq$3, --.

In column 20, line 29, delete "(y+z)$\leqq$3;" insert -- "(y+z)$\leq$3; --.

Signed and Sealed this
Fourteenth Day of August, 2012

David J. Kappos
*Director of the United States Patent and Trademark Office*